(12) United States Patent
Chen

(10) Patent No.: US 9,104,292 B2
(45) Date of Patent: Aug. 11, 2015

(54) USER INTERFACE OF ELECTRONIC APPARATUS FOR DISPLAYING APPLICATION INDICATORS

(75) Inventor: Yu-Chuan Chen, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 1272 days.

(21) Appl. No.: 12/344,256

(22) Filed: Dec. 25, 2008

(65) Prior Publication Data

US 2009/0172594 A1 Jul. 2, 2009

(30) Foreign Application Priority Data

Dec. 26, 2007 (TW) .............................. 96150311 A

(51) Int. Cl.
| | |
|---|---|
| *G06F 3/048* | (2013.01) |
| *G06F 3/0481* | (2013.01) |
| *G06F 3/0482* | (2013.01) |
| *G06F 3/0486* | (2013.01) |
| *G06F 3/0488* | (2013.01) |
| *H04M 1/725* | (2006.01) |

(52) U.S. Cl.
CPC .......... *G06F 3/04817* (2013.01); *G06F 3/0482* (2013.01); *G06F 3/0486* (2013.01); *G06F 3/04883* (2013.01); *H04M 1/72583* (2013.01); *H04M 1/72544* (2013.01); *H04M 1/72586* (2013.01); *H04M 2250/22* (2013.01)

(58) Field of Classification Search
CPC . G06F 3/0482; G06F 3/0486; G06F 3/04817; G06F 3/04883; H04M 1/72544; H04M 1/72583; H04M 1/72586; H04M 2250/22
USPC ......... 715/810, 850, 782, 811, 822, 825, 830, 715/834, 835
See application file for complete search history.

(56) References Cited

U.S. PATENT DOCUMENTS

| | | | | |
|---|---|---|---|---|
| 5,214,756 | A | * | 5/1993 | Franklin et al. ................ 715/839 |
| 5,715,413 | A | * | 2/1998 | Ishai et al. ..................... 715/825 |
| 5,986,638 | A | * | 11/1999 | Cheng ............................ 715/857 |
| 6,489,975 | B1 | | 12/2002 | Patil |

(Continued)

FOREIGN PATENT DOCUMENTS

| | | |
|---|---|---|
| CN | 1841293 A | 10/2006 |
| CN | 101017420 A | 8/2007 |

(Continued)

OTHER PUBLICATIONS

European Office action issued on Mar. 7, 2011 for the EP application No. 08022441.3, filing date Dec. 23, 2008, p. 1-6.

(Continued)

*Primary Examiner* — Patrick Riegler
(74) *Attorney, Agent, or Firm* — Winston Hsu; Scott Margo

(57) ABSTRACT

A user interface of electronic apparatus includes at least one launched indicator and at least one non-launched indicator, and the arrangement of the launched indicator and non-launched indicators forms a loop path so that the indicators can have a revolution around a center of the loop path according to a direction command inputted by a user. Each launched indicator indicates an executed program, each non-launched indicator indicates a non-executed program, and the indicator moved to a specific location is defined as a selectable indicator. The user can control the program indicated by the selectable indicator with any operation.

18 Claims, 8 Drawing Sheets

(56) References Cited

U.S. PATENT DOCUMENTS

| | | | |
|---|---|---|---|
| 6,670,984 B1* | 12/2003 | Tanaka et al. | 348/159 |
| 7,096,431 B2* | 8/2006 | Tambata et al. | 715/834 |
| 7,222,356 B1* | 5/2007 | Yonezawa et al. | 725/105 |
| 7,346,855 B2* | 3/2008 | Hellyar et al. | 715/783 |
| 7,418,671 B2* | 8/2008 | Hama et al. | 715/830 |
| 7,480,873 B2* | 1/2009 | Kawahara | 715/848 |
| 2002/0101458 A1 | 8/2002 | SanGiovanni | |
| 2003/0098890 A1 | 5/2003 | Makinen | |
| 2003/0112279 A1* | 6/2003 | Irimajiri | 345/810 |
| 2004/0250217 A1* | 12/2004 | Tojo et al. | 715/810 |
| 2005/0039140 A1 | 2/2005 | Chen | |
| 2005/0261011 A1 | 11/2005 | Scott | |
| 2006/0010394 A1* | 1/2006 | Chaudhri et al. | 715/779 |
| 2006/0048076 A1* | 3/2006 | Vronay et al. | 715/850 |
| 2006/0069604 A1 | 3/2006 | Leukart | |
| 2006/0095865 A1* | 5/2006 | Rostom | 715/810 |
| 2006/0212829 A1* | 9/2006 | Yahiro et al. | 715/810 |
| 2006/0218503 A1 | 9/2006 | Matthews | |
| 2006/0242602 A1 | 10/2006 | Schechter | |
| 2007/0035513 A1* | 2/2007 | Sherrard et al. | 345/157 |
| 2007/0152981 A1* | 7/2007 | Im et al. | 345/173 |
| 2007/0157125 A1 | 7/2007 | Peters | |
| 2007/0180392 A1* | 8/2007 | Russo | 715/765 |
| 2007/0261003 A1* | 11/2007 | Reissmueller | 715/810 |
| 2007/0271528 A1* | 11/2007 | Park et al. | 715/810 |
| 2007/0273669 A1* | 11/2007 | Park et al. | 345/173 |
| 2007/0288860 A1* | 12/2007 | Ording et al. | 715/779 |
| 2008/0004084 A1* | 1/2008 | Park | 455/566 |
| 2008/0022228 A1* | 1/2008 | Kwon et al. | 715/838 |
| 2010/0306703 A1* | 12/2010 | Bourganel et al. | 715/823 |

FOREIGN PATENT DOCUMENTS

| | | |
|---|---|---|
| EP | 1 555 795 A1 | 7/2005 |
| TW | 200506727 | 2/2005 |
| TW | I273489 | 2/2007 |

OTHER PUBLICATIONS

Shuo Wang; Margin Poturalski; David Vronay:"Designing a Generalized 3D Carousel View", conference proceedings of CHI 2005, Apr. 2-7, 2005, pp. 2017-2020, XP002586939, Portland, Oregon, USA.

IBM Technical Disclosure Bulletin:"Intelligent Icon Arrangement Process for the Desktop Environment", vol. 37 No. 03 Mar. 1994, pp. 655/656, XP000441623.

Office action mailed on Sep. 29, 2011 for the Taiwan application No. 096150311, filing date Dec. 26, 2007, p. 1-4.

European office action issued on Jul. 13, 2012 for the EP application No. 08022441.3, filing date Dec. 23, 2008, p. 1-10.

* cited by examiner

USER INTERFACE OF ELECTRONIC APPARATUS FOR DISPLAYING APPLICATION INDICATORS

BACKGROUND OF THE INVENTION

1. Field of the Invention

The present disclosure relates to a user interface of an electronic apparatus, and more particularly, to a user interface for managing application programs.

2. Description of the Prior Art

A conventional operation interface of a mobile phone arranges all functions with a matrix approach. As a result, the operation is not very convenient for a user and requires a more complex operation to delete a specific item. Therefore, the interface browsing approach of the conventional art has poor operational efficiency. A conventional browsing approach utilizes a key operation to browse information. The key operation is not convenient and does not satisfy the user's need, as the user may accidentally delete information.

A touch interface browsing approach utilizes fingers or a stylus to replace the conventional key operation. The display approach of the data is still the same as the conventional art, however. Accordingly, when the user uses software or programs, the user may open unwanted software or programs due to the small touch sensitive area for each software or program, thereby causing inconvenience. As a result, the conventional touch interface browsing operation is difficult to operate successfully.

SUMMARY OF THE INVENTION

It is therefore one of the objectives of the claimed disclosure to provide a user interface of the electronic apparatus, to solve the above-mentioned problems and enhance convenience of interface browsing and further make the operation interface more practical.

According to one embodiment of the claimed disclosure, a user interface of an electronic apparatus is provided. The user interface comprises at least one launched indicator, each launched indicator indicating an executed program, at least one non-launched indicator, each non-launched indicator indicating a non-executed program, wherein the arrangement of the launched indicator and non-launched indicator forms a loop path, and the launched indicator and non-launched indicator have a revolution around a centre of the loop path according to a received direction command, and a specific location, wherein the launched indicator or non-launched indicator moving to the specific location is a selectable indicator, and then the executed program or the non-executed program indicated by the selectable indicator can be called or operated.

According to one embodiment of the claimed disclosure, a method for generating a user interface is provided. The method comprises providing at least one non-launched indicator for indicating a non-executed program, providing at least one launched indicator for indicating an executed program, arranging the non-launched indicator and the launched indicator along a loop path, when a direction command is received, making the non-launched indicator and the launched indicator have a revolution around a centre of the loop path according to the received direction command, and defining the executed program or the non-executed program indicated by the launched indicator or non-launched indicator moved to a specific location as an program can be called or operated by the user.

One advantage of the method of the user interface of the present disclosure is providing a browsing interface with more practical.

Another advantage of the method of the user interface of the present disclosure is that it enhances convenience in interface browsing.

Another advantage of the method of the user interface of the present disclosure is that it satisfies the user's requirements in operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
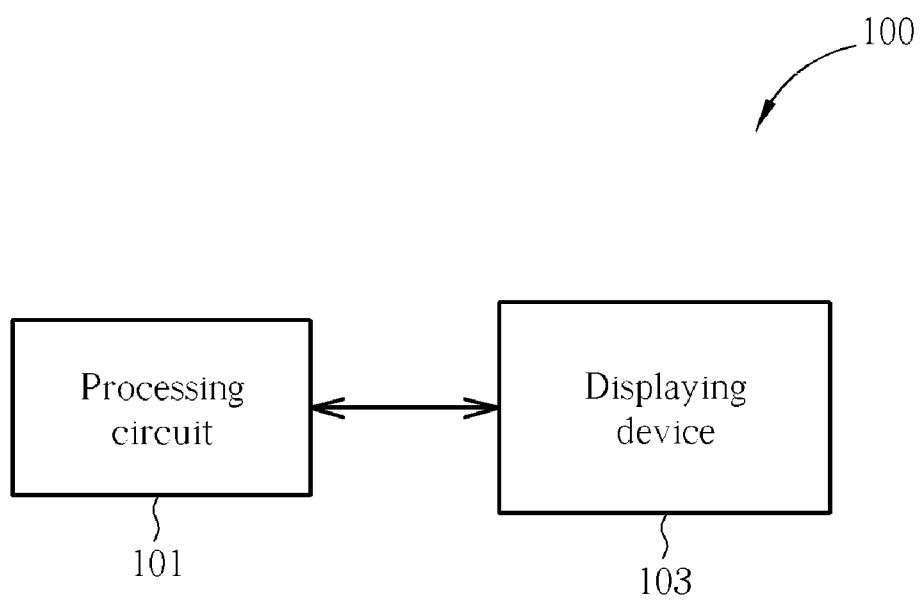
FIG. 1 is a diagram of a user interface according to an embodiment of the present disclosure.

Please refer to FIG. 1. The user interface of the present disclosure may utilize an electronic apparatus shown in FIG. 1. The apparatus 100 comprises a processing circuit 101, and a displaying device 103, coupled to the processing circuit 101. The processing circuit 101 executes a specific program code (not shown in FIG. 1) to control the displaying device 103 to display the user interface illustrated in detail through FIG. 2 to FIG. 8. In addition, a user operates the user interface and thereby transmits commands for the electronic device 100, and then the commands are responded to on the user interface through processes of the processing circuit 101.

Figure 2:
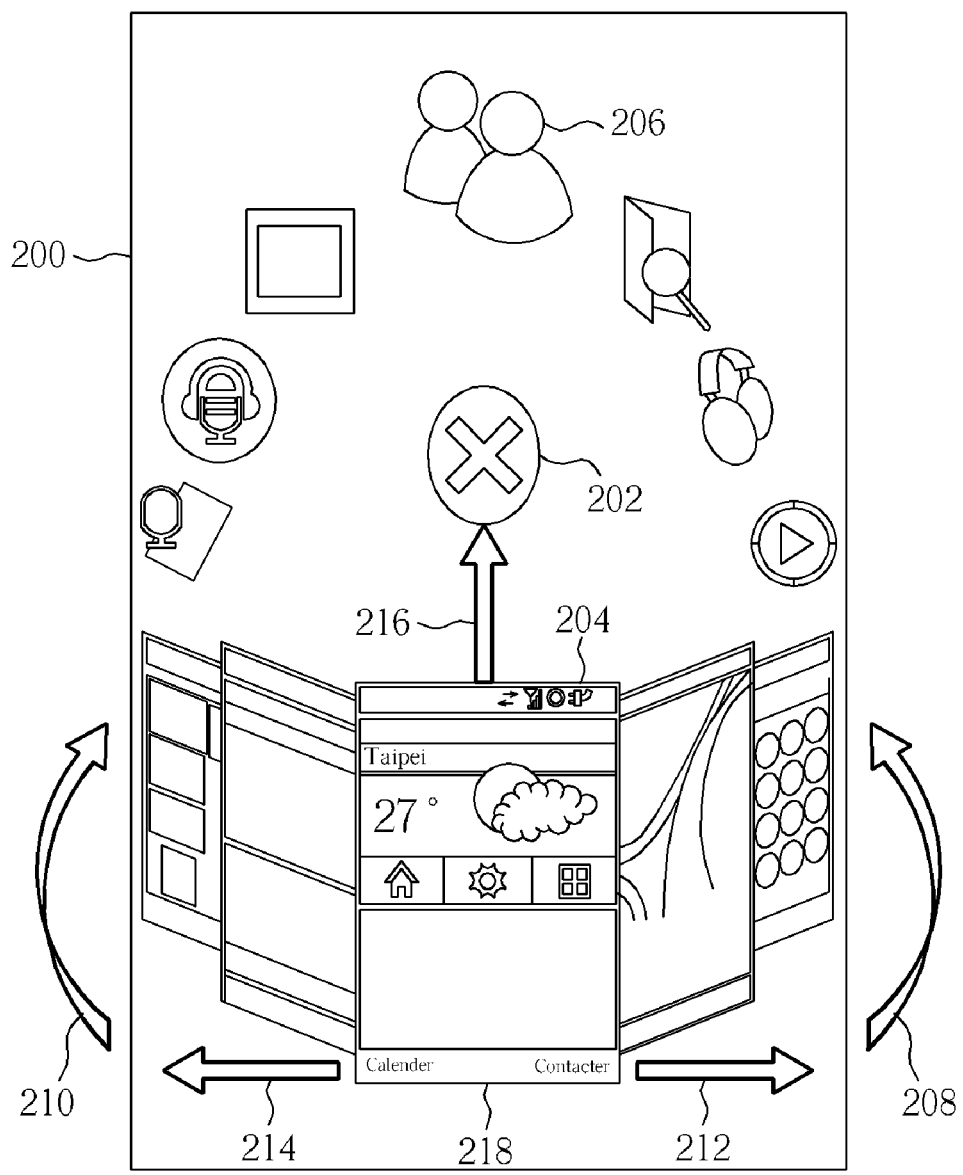
FIG. 2 is a diagram of the user interface according to an embodiment of the present disclosure.

Please refer to FIG. 2. FIG. 2 is a diagram of the user interface 200 according to an embodiment of the present disclosure. As shown in FIG. 2, the user interface 200 has a plurality of launched indicators 204 and a plurality of non-launched indicators 206, and arrangement of the indicators 204 and 206 forms a loop path, wherein the loop path may be a circular path, a square path, an elliptical path or a closed path of any shape. Accordingly, the loop paths shown in FIG. 2 are for illustrative purposes only, and are not meant to be limitations of the present disclosure. Each of the indicators 204 and 206 respectively indicates a specific program, in addition, each of the launched indicators 204 indicates an opened and executed program, and each of the non-launched indicators 206 indicates a closed and non-executed program. Accordingly, the above-mentioned programs may be a browser, for example Microsoft Internet Explorer, a multimedia displaying program or a common application program. In this embodiment, each of the launched indicators 204 is a retrieved frame of the executed application program, for example screenshot capture approach, and each of the non-launched indicators 206 is a fixed icon. Furthermore, the above-mentioned launched indicators and the above-mentioned non-launched indicators are for illustrative purposes only, and are not meant to be limitations of the present disclosure. As a result, the launched indicators 204 and the non-launched indicators 206 are only identified in actual implementations.

In the user interface 200, the user may transmit a direction command for the launched indicators 204 and the non-launched indicators 206 of the loop path to have a revolution around the centre of the loop path according to a revolution direction 208 or 210 to select any one of the launched indicator and the non-launched indicator 206 for performing further operations. For example, when the user interface 200 is displayed on a touch panel, the user may utilize a finger or a stylus to flip any one of the launched indicator and the non-launched indicator 206 of the loop path for revolving the loop path. Therefore, location of the launched indicator 204 and the non-launched indicator 206 are moved simultaneously to be browsed. Further, when the user flips the loop path to the right according to a direction 212 on the user interface 200, the loop path formed by the launched indicators 204 and the non-launched indicators 206 has a counterclockwise revolution (in a direction 208) around the centre of the loop path. When the user flips the loop path to the left according to a direction 214 on the user interface 200, the loop path formed by the launched indicators 204 and the non-launched indicators has a clockwise revolution (in a direction 210) around the centre of the loop path. Accordingly, the launched indicators 204 or the non-launched indicators 206 moved to a specific location, a specific location 218 for example, is the selected indicator for the user. In another embodiment of the present disclosure, the launched indicators 204 or the non-launched indicators 206 moved to the specific location 218 is enlarged to indicate that launched indicator 204 or the non-launched indicator 206 is selected, and thereby the user may perform various operations against the program indicated by the selected indicator.

In FIG. 2, the selected indicator is the launched indicator 204 located at the specific location 218. At the same time, the user may call the indicated and executed application program through transmitting commands to browse the execution situations of the above-mentioned application program to further perform each needed operation. On the other hand, the selected indicator is one of the non-launched indicators 206 at the specific location 218, and thereby the user may execute the indicated application program, accordingly, the user performs needed operations for the above-mentioned application program.

In another embodiment of the present disclosure, an inner location surrounded by the loop path formed by the arrangement of the launched indicators 204 and the non-launched indicators 206 further have a specific function icon 202. In the embodiment, the specific function icon 202 indicates a close function and is displayed on the centre of the loop path. In the embodiment, when the user drags one of the launched indicators 204 (for example the launched indicator 204 located at the specific location 218) to the location of the specific function icon 202 according to the direction 216, a close function is directly carried out to close the application program indicated by the dragged launched indicator 204, and thereby the dragged launched indicator 204 will be transformed into another one of the non-launched indicators 206. Accordingly, the above-mentioned embodiment increases the speed of closing application programs. In addition, the specific function indicated by the specific function icon 202 may be set according to practical requirement, and is not meant to be a limitation of the present disclosure.

Figure 3:
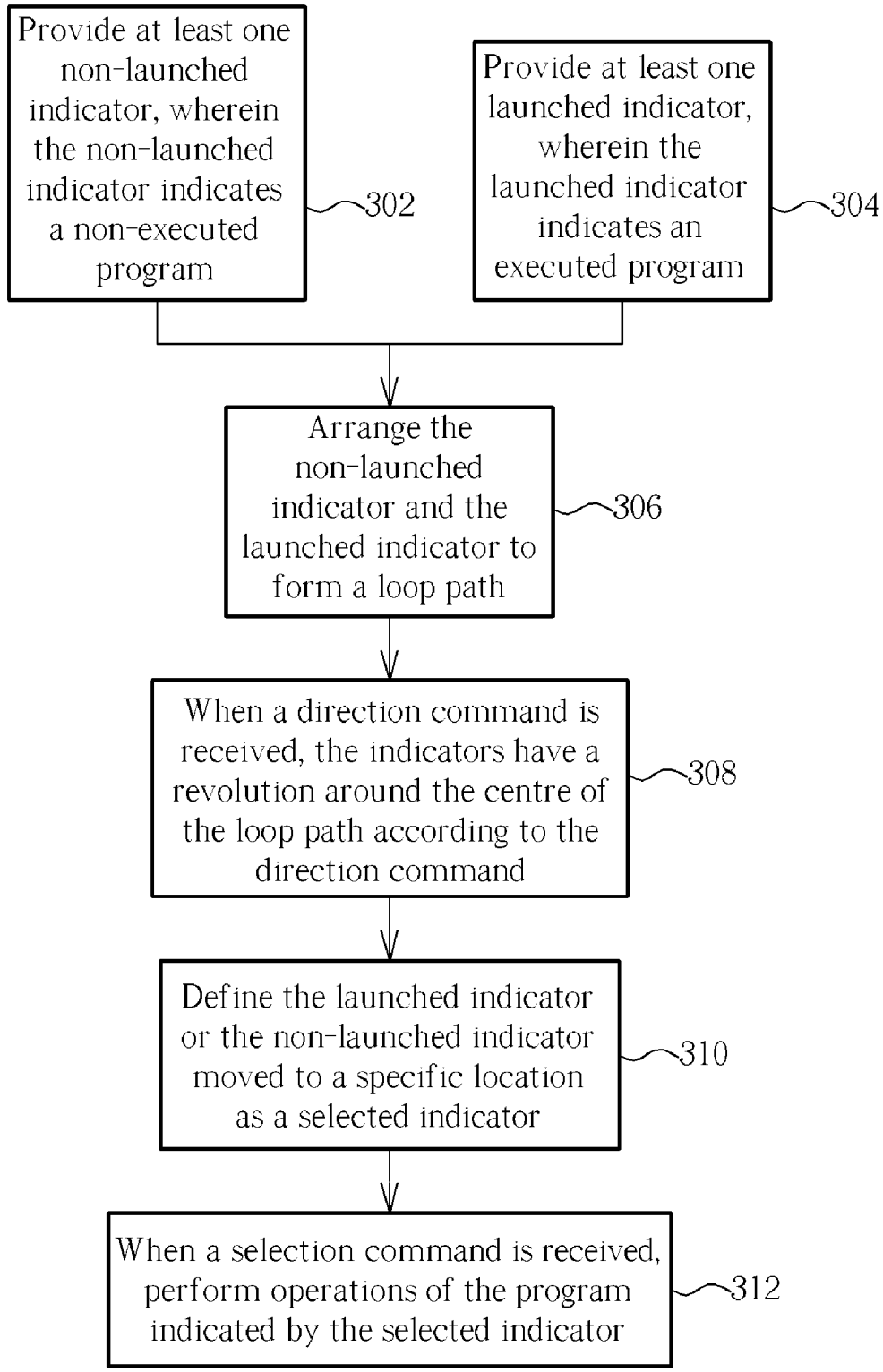
FIG. 3 is a flowchart illustrating a method for generating a user interface according to an embodiment of the present disclosure.

A method for generating the user interface 200 shown in FIG. 2 is further provided in FIG. 3. The method may be implemented in various electronic or mobile apparatus. Referring to the flowchart shown in FIG. 3, the steps for generating a user interface are described as follows. As shown in FIG. 3, in Steps 302 and 304, at least one non-launched indicator and at least one launched indicator are provided, wherein the non-launched indicator indicates a non-executed program and the launched indicator indicates an executed program. The related descriptions of the launched indicator and the non-launched indicator are described in the above-mentioned illustrations, and are therefore not explained in detail here for brevity. In Step 306, the non-launched indicator and the launched indicator are arranged to form a loop path. As shown in FIG. 2, the launched indicator 204 is arranged at the centre of the lower half part of the loop path, however, in another embodiment, the launched indicator 204 is arranged at the centre of the upper half part of the loop path. In other words, the present disclosure may utilize any arrangement order to arrange the launched indicator 204 and the non-launched indicator 206 according to design requirements. Furthermore, in Step 308, when a direction command is received, the above-mentioned indicators including the launched indicator 204 and the non-launched indicator 206 of the loop path have a revolution around the centre of the loop path according to the direction indicated by the above-mentioned direction command to move each of the above-mentioned indicators. In Step 310, the above-mentioned indicator moved to a specific location, for example the launched indicator 204 or the non-launched indicator 206, is defined as a selected indicator. Accordingly, in Step 312, when a selection command is received, the program indicated by the selected indicator can be operated according to the selection command.

In another embodiment, the claimed method further comprises the step of providing a specific function icon, wherein the specific function icon may be arranged at the inner location of the loop path and indicates a specific function or operation. Furthermore, when for one of the above-mentioned indicators is moved to the location of the specific function icon, the function or operation indicated by the specific function icon will perform with the program indicated by the moved indicator. It should be noted that the moved indicator may be the launched indicator 204 or the non-launched indicator 206.

Figure 4:
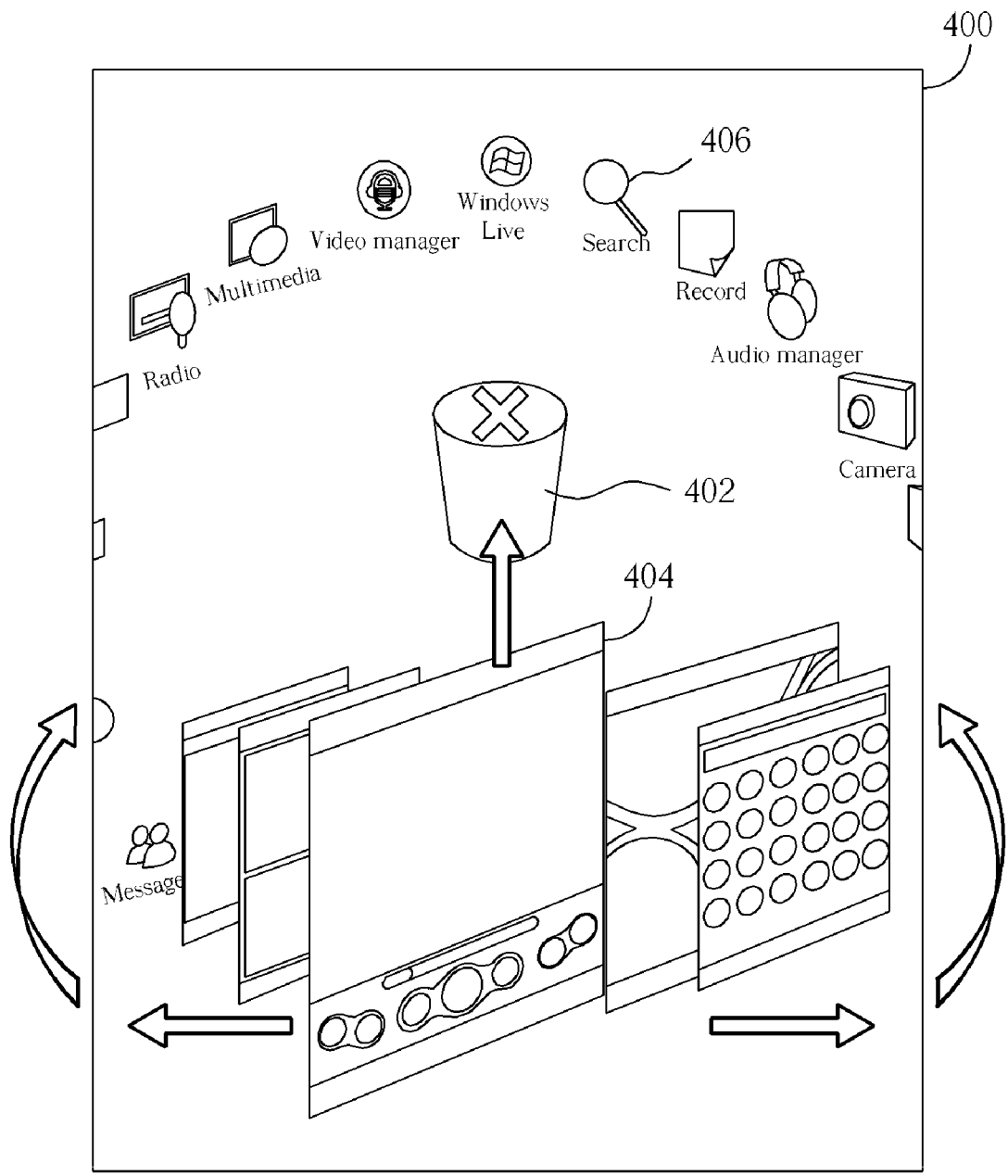
FIG. 4 is a diagram of the user interface according to another embodiment of the present disclosure.

Please refer to FIG. 4. FIG. 4 is a diagram of the user interface 400 according to another embodiment of the present disclosure. Please note that operations of the user interface 400 are similar to the operations of the user interface 200 shown in FIG. 2, where the difference between the user interface 400 and the user interface 200 is that the specific function icon 402, launched indicators 404 and non-launched indicators 406 of the user interface 400 are represented in three-dimensional to make the user have a different visual experience. Additionally, in this embodiment, the specific function icon 402 indicates the close function for simultaneously closing all of the application programs indicated by the launched indicators 404 when the specific function icon 402 is clicked by user. Then, all of the launched indicators 404 will be further transformed into other non-launched indicators 406. Please note that the above-mentioned examples are for illustrative purposes only and are not meant to be a limitation of the present disclosure.

It should be noted that, to extend possible usage, in other embodiments of the present disclosure, an information of the executed programs indicated by the launched indicators, for example the launched indicators 404 shown in FIG. 4, is displayed around the launched indicators. For example, without limitation, information of storage capacity of the program, utility rate of memory, occupation rate of system resource or execution time etc can be displayed.

Figure 5:
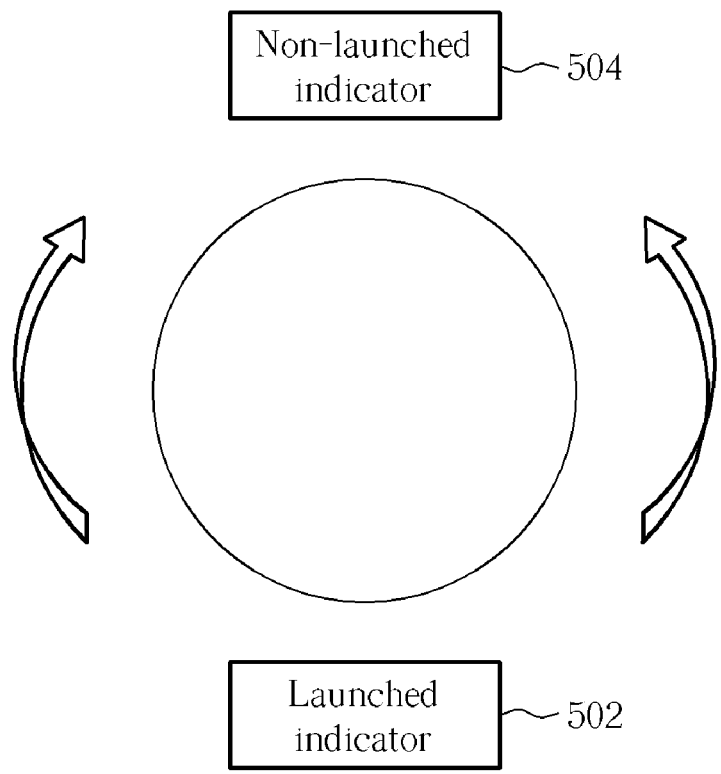
FIG. 5 is a diagram illustrating sorting each indicator according to one embodiment of the present disclosure.

Please refer to FIG. 5. FIG. 5 is a diagram illustrating sorting each indicator according to one embodiment of the present disclosure. As shown in FIG. 5, the indicator which has the highest frequency to be selected is displayed on a predetermined location of the loop path. As shown in FIG. 5, a launched indicator 502 has the highest frequency to be selected in all the launched indicators, accordingly, the launched indicator 502 is displayed on the centre of the lower half part of the loop path. On the other hand, a non-launched indicator 504 has the highest frequency to be selected in all the non-launched indicators, accordingly, the non-launched indicator 504 is displayed on the centre of the upper half part of the loop path. Please note that the above-mentioned locations of the launched indicator 502 and the non-launched indicator 504 are for illustrative purposes only and are not meant to be a limitation of the present disclosure.

Figure 6:
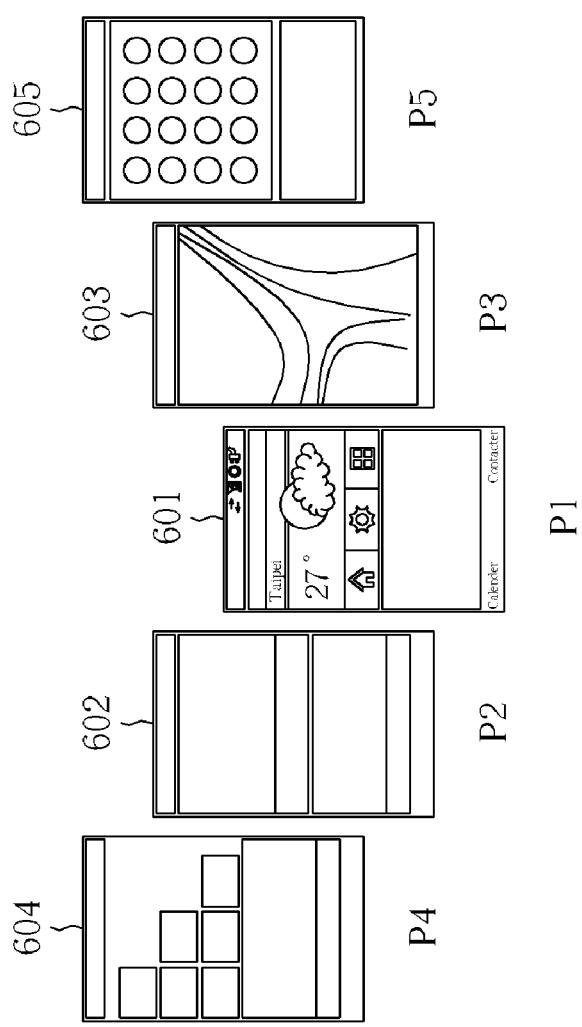
FIG. 6 is a diagram illustrating an example of sorting the launched indicators according to the present disclosure.

Please refer to FIG. 6. FIG. 6 is a diagram illustrating sorting the indicators according to the present disclosure, wherein the indicator are launched indicators as an illustrative example. As shown in FIG. 6, in a preferred embodiment, the present disclosure sorts the plurality of the launched indicators and defines the a location (for example the central location of the lower half part of the loop path) at locate the launched indicator which has the highest frequency to be selected. In addition, the other launched indicators can be alternately arranged at the two sides (left and right) of the central location according to the frequency to be selected. For example, in all of the current launched indicators, an indicator 601 has the highest frequency to be selected, therefore, the indicator 601 is arranged at the central location (for example P1). In addition, the frequency to be selected of an indicator 602 is smaller than the indicator 601 and larger than the other indicators. As a result, the indicator 602 is arranged at the left side of the indicator 601 (for example P2). However, the frequency to be selected of an indicator 603 is smaller than the indicator 602 and larger than the other indicators, therefore, the indicator 603 is arranged at the right side of the indicator 601 (for example P3). Additionally, the frequency to be selected of an indicator 604 is smaller than the indicator 603 and larger than the other indicators, therefore, the indicator 604 is arranged at the left side of the indicator 602 (for example P4). Lastly, the frequency to be selected of an indicator 605 is smaller than the indicator 604, therefore, the indicator 605 is arranged at the right side of the indicator 603 (for example P5). Furthermore, the remaining launched indicators are sorted according to the above-mentioned alternating arranging approach until all of the launched indicators are sorted completely. Please note that the above-mentioned sorting approach is for illustrative purposes only and is not meant to be a limitation of the present disclosure.

Figure 7:
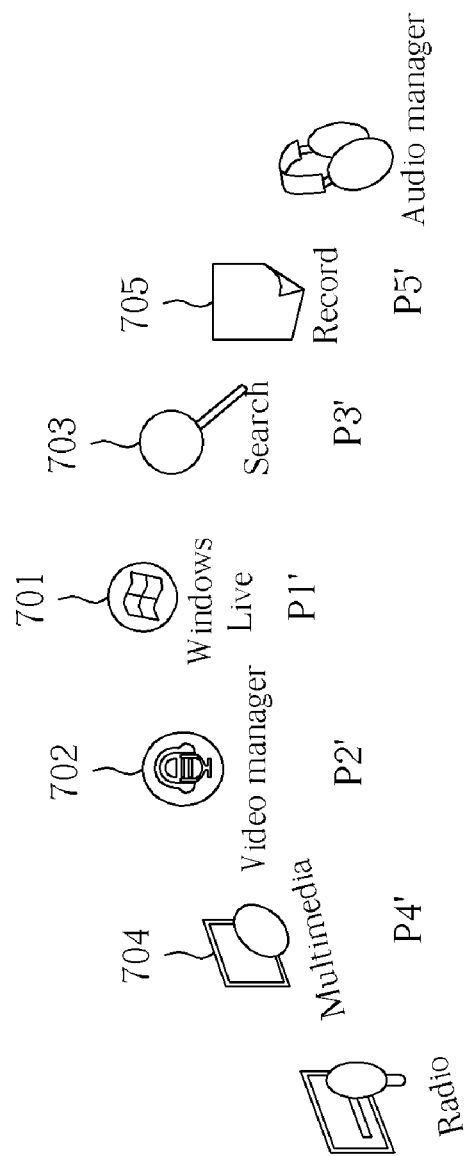
FIG. 7 is a diagram illustrating an example of sorting the non-launched indicators according to the present disclosure.

Please refer to FIG. 7. FIG. 7 is a diagram illustrating a detailed example illustrating sorting the indicators according to the present disclosure, wherein the indicators are non-launched indicators as an illustrative example. As shown in FIG. 7, in a preferred embodiment, the present disclosure sorts the plurality of the non-launched indicators and defines a location (for example the central location of the upper half part of the loop path) to located the non-launched indicator which has the highest frequency to be selected at the central location. In addition, the other non-launched indicators can be alternately arranged at the two sides (left and right) of the central location according to the frequency to be selected. As shown in FIG. 7, for example, the order of the frequency to be selected of non-launched indicators 701~705 from high to low is: the indicator 701, the indicator 702, the indicator 703, the indicator 704, and the indicator 705. As a result, the indicators 701~705 are arranged at locations P1'~P5' respectively. Additionally, the sorting approach of FIG. 7 is similar to the sorting approach of the embodiment shown in FIG. 6. For the sake of brevity, further description is omitted here. Similarly, the sorting approach shown in FIG. 7 is for illustrative purposes only and is not meant to be a limitation of the present disclosure.

Figure 8:
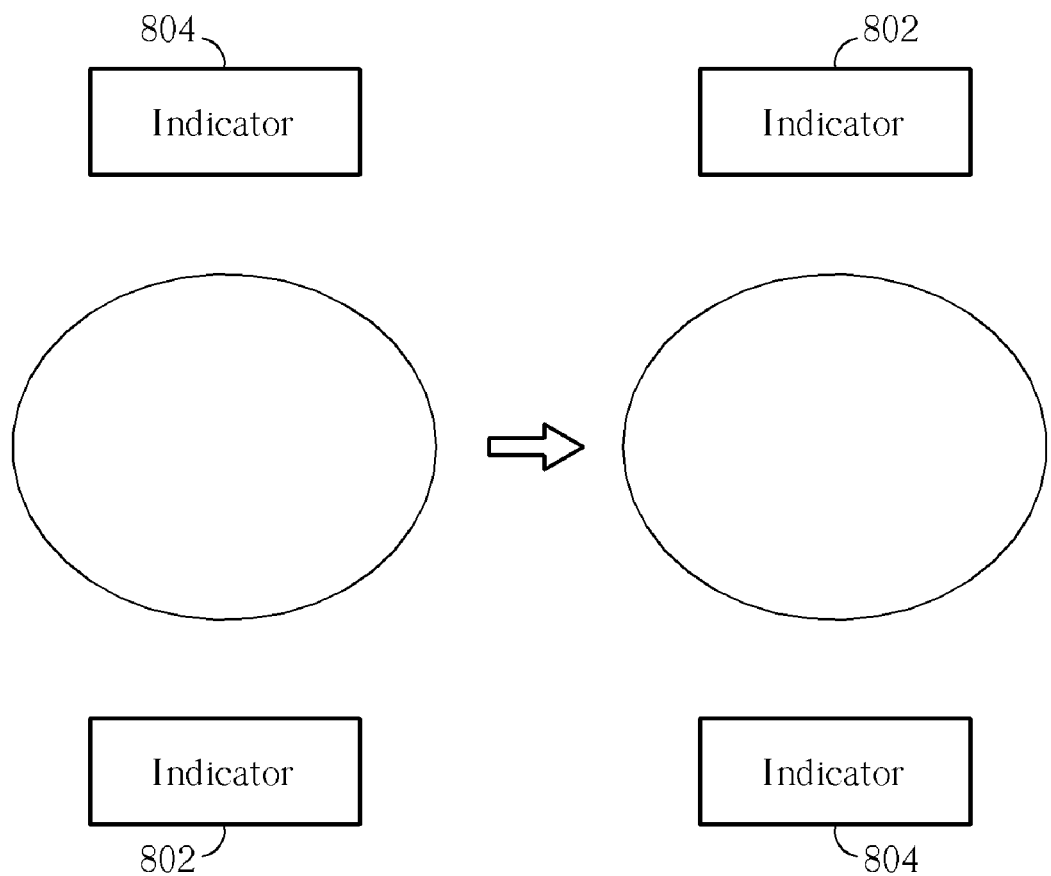
FIG. 8 is a diagram for fast moving indicators according to an embodiment of the present disclosure.

Please refer to FIG. 8. FIG. 8 is a diagram for fast moving indicators according to an embodiment of the present disclosure. As shown in FIG. 8, For extending the possible usages, the present disclosure further flips the loop path to quickly change locations of the plurality of the indicators to satisfy the user's operation habits, for example, in an up-down flip locations of indicators 802 and 804 may be exchanged. As a result, the above-mentioned flipping approach further increases convenience of the interface browsing. Please note that the present disclosure need not follow the above-mentioned flipping direction of the aforementioned embodiment. For example, the user further controls the loop path through touching the interface to generate a left-right flip to change the locations of the plurality of the indicators. This alternative design also falls within the scope of the present disclosure.

In conclusion, the method of user interface (a touch interface) browsing claimed by the present disclosure makes the interface operation convenient, can satisfy a user's requirement, and makes the interface browsing more practical. As a result, the method of the user interface claimed by the present disclosure solves the problems of complex operations caused by the conventional interface.

Those skilled in the art will readily observe that numerous modifications and alterations of the device and method may be made while retaining the teachings of the invention.

What is claimed is:

1. A user interface, implemented on an electronic apparatus, comprising:
    a plurality of launched indicators, each launched indicator indicating an executed program that is executed by a processing circuit;
    a plurality of non-launched indicators, each non-launched indicator indicating a non-executed program, wherein the arrangement of the plurality of launched indicators and the plurality of non-launched indicators forms a loop path, and the plurality of launched indicators and the plurality of non-launched indicators have a revolution around a center of the loop path according to a received direction command;
    a specific location in the loop path, wherein when one of the plurality of launched indicators or one of the plurality of non-launched indicators is moved to the specific location, a selectable indicator indicates that the executed programs or the non-executed programs can be called or operated; and a specific function icon at an inner location surrounded by the loop path, the specific function icon indicating a close function against executed programs, when at least one launched indicator of the plurality of launched indicators is dragged to the location of the specific function icon with a dragging command, the close function carries out to close the executed program indicated by the dragged launched indicator and the dragged launched indicator transforms into another non-launched indicator, wherein locations of the plurality of launched indicators are up and down respectively exchanged with locations of the plurality of non-launched indicators by flipping up and down the loop path, and wherein the user interface is displayed by a displaying device coupled to the processing circuit.

2. The user interface as claimed in claim 1, wherein the plurality of launched indicators and the plurality of non-launched indicators are displayed on a touch panel of the electronic apparatus.

3. The user interface as claimed in claim 1, wherein the at least one launched indicator of the plurality of launched indicators is a flame captured from an image displayed when the executed program indicated by the at least one launched indicator is executed.

4. The user interface as claimed in claim 1, wherein the plurality of non-launched indicators are icons.

5. The user interface as claimed in claim 1, wherein when the specific function icon is selected by a selection command, the close function carries out to close all executed programs indicated by the plurality of launched indicators and the plurality of launched indicators transform into other non-launched indicators.

6. The user interface as claimed in claim 1, wherein the locations of the plurality of launched indicators and the plurality of non-launched indicators are arranged according to the frequency corresponding to the plurality of launched indicators that have been selected and the frequency corresponding to the plurality of non-launched indicators that have been selected.

7. The user interface as claimed in claim 6, wherein a highest frequency launched indicator that has the highest frequency of being selected is arranged at a center of the lower half part of the loop path.

8. The user interface as claimed in claim 6, wherein a highest frequency non-launched indicator that has the highest frequency of being selected is arranged at a center of the upper half part of the loop path.

9. The user interface as claimed in claim 1, wherein executed program related information is displayed around the plurality of launched indicators indicating executed programs.

10. A method for generating a user interface, implemented on an electronic apparatus, comprising:

providing a plurality of non-launched indicators for each indicating a non-executed program;

using a processing circuit to provide a plurality of launched indicators for each indicating an executed program;

arranging the plurality of non-launched indicators and the plurality of launched indicators to form a loop path;

when a direction command is received, making the plurality of non-launched indicators and the plurality of launched indicators have a revolution around a center of the loop path according to the received direction command;

providing a specific function icon at an inner location surrounded by the loop path, wherein the specific function icon indicates a close function against the executed programs;

when at least one launched indicator of the plurality of launched indicators is dragged to the location of the specific function icon with a dragging command, using the processing circuit for carrying out the close function to close the executed program indicated by the dragged launched indicator and transforming the dragged launched indicator into another non-launched indicator;

defining the executed programs or the non-executed programs indicated by the plurality of launched indicators or the plurality of non-launched indicators moved to a specific location in the loop path as operable programs; and exchanging locations of the plurality of launched indicators with locations of the plurality of non-launched indicators up and down respectively by flipping up and down the loop path wherein the launched indicators and the non-launched indicators are displayed on the loop path.

11. The method as claimed in claim 10, wherein the at least one launched indicator of the plurality of launched indicators is provided by capturing from an image displayed when the executed program indicated by the at least one launched indicator is executed.

12. The method as claimed in claim 10, wherein the plurality of non-launched indicator are provided by providing icons.

13. The method as claimed in claim 10, further comprising when the specific function icon is selected by a selection command, carrying out the close function to close all executed programs indicated by the plurality of launched indicators and transforming the plurality of launched indicators into other non-launched indicators.

14. The method as claimed in claim 10, wherein the step of arranging the plurality of non-launched indicators and the plurality of launched indicators to form the loop path further comprises arranging the locations of the plurality of launched indicators and the plurality of non-launched indicators according to the frequency corresponding to the plurality of launched indicators that have been selected and the frequency corresponding to the plurality of non-launched indicator that have been selected.

15. The method as claimed in claim 14, wherein a highest frequency launched indicator that has the highest frequency of being selected is arranged at a center of the lower half part of the loop path.

16. The method as claimed in claim 10, further comprising displaying executed program related information around the plurality of launched indicators indicating executed programs.

17. A user interface, implemented on an electronic apparatus, comprising:

a plurality of launched indicators, each launched indicator indicating an executed program that is executed by a processing circuit;

a plurality of non-launched indicators, each non-launched indicator indicating a non-executed program, wherein the arrangement of the plurality of launched indicators and the plurality of non-launched indicators forms a loop path, and the plurality of launched indicators and the plurality of non-launched indicators have a revolution around a center of the loop path according to a received direction command;

a specific location in the loop path, wherein when one of the plurality of launched indicators or one of the plurality of non-launched indicators is moved to the specific location, a selectable indicator indicates that the executed programs or the non-executed programs can be called or operated; and a specific function icon at an inner location surrounded by the loop path, the specific function icon indicating a close function against executed programs, when the specific function icon is selected by a selection command, the close function carries out to close all executed programs indicated by the plurality of launched indicators and the plurality of launched indicators transform into other non-launched indicators, wherein locations of the plurality of launched indicators are up and down respectively exchanged with locations of the plurality of non-launched indicators by flipping up and down the loop path, and wherein the user interface is displayed by a displaying device coupled to the processing circuit.

18. A method for generating a user interface, implemented on an electronic apparatus, comprising:

providing a plurality of non-launched indicators each for indicating a non-executed program;

using a processing circuit to provide a plurality of launched indicators each for indicating an executed program;

arranging the plurality of non-launched indicators and the plurality of launched indicators to form a loop path;

when a direction command is received, making the plurality of non-launched indicators and the plurality of launched indicators have a revolution around a center of the loop path according to the received direction command;

providing a specific function icon at an inner location surrounded by the loop path, wherein the specific function icon indicates a close function against the executed programs;

when the specific function icon is selected by a selection command, using the processing circuit for carrying out the close function to close all executed programs indicated by the plurality of launched indicators and transforming the plurality of launched indicators into other non-launched indicators;

defining the executed programs or the non-executed programs indicated by the plurality of launched indicators or the plurality of non-launched indicators moved to a specific location in the loop path as operable programs; and exchanging locations of the plurality of launched indicators with locations of the plurality of non-launched indicators up and down respectively by flipping up and down the loop path wherein the plurality of launched indicators and the plurality of non-launched indicators are displayed on the loop path.

* * * * *